United States Patent
Fuchiwaki et al.

(10) Patent No.: US 9,016,619 B2
(45) Date of Patent: Apr. 28, 2015

(54) FLAPPING FLYING ROBOT

(75) Inventors: Masaki Fuchiwaki, Kitakyushu (JP);
Tadatsugu Imura, Kitakyushu (JP);
Kazuhiro Tanaka, Kitakyushu (JP)

(73) Assignee: Kyushu Institute of Technology, Kitakyushu-shi (JP)

( * ) Notice: Subject to any disclaimer, the term of this patent is extended or adjusted under 35 U.S.C. 154(b) by 614 days.

(21) Appl. No.: 13/384,424

(22) PCT Filed: Jul. 27, 2010

(86) PCT No.: PCT/JP2010/062627
§ 371 (c)(1),
(2), (4) Date: Jan. 17, 2012

(87) PCT Pub. No.: WO2011/013667
PCT Pub. Date: Feb. 3, 2011

(65) Prior Publication Data
US 2012/0115390 A1    May 10, 2012

(30) Foreign Application Priority Data
Jul. 28, 2009 (JP) .................................. 2009-175640

(51) Int. Cl.
*B64C 33/02* (2006.01)
*B64C 33/00* (2006.01)
*A63H 27/00* (2006.01)

(52) U.S. Cl.
CPC .................. *B64C 33/02* (2013.01); *B64C 33/00* (2013.01); *A63H 27/008* (2013.01)

(58) Field of Classification Search
CPC ...... B64C 33/02; B64C 33/025; B64C 33/00; B54C 33/00; A63H 27/008; A63H 29/18

USPC ....................... 244/22, 20, 72, 11, 28; 446/35
See application file for complete search history.

(56) References Cited

U.S. PATENT DOCUMENTS 2,578,845 A * 12/1951 Schmidt .......................... 244/72
3,626,555 A * 12/1971 Albertini et al. ................. 446/35

(Continued)

FOREIGN PATENT DOCUMENTS

| CN | 101049858 A | 10/2007 |
|---|---|---|
| JP | 2004-90909 A | 3/2004 |

(Continued)

OTHER PUBLICATIONS

WO 2007026701—english machine translation.*

(Continued)

*Primary Examiner* — Tien Dinh
*Assistant Examiner* — Alexander V Giczy
(74) *Attorney, Agent, or Firm* — Westerman, Hattori, Daniels & Adrian, LLP

(57) ABSTRACT

A flapping flying robot including a body with a longitudinal side extending in a front to back direction, a left wing and a right wing respectively including a left front frame and a right front frame, base ends of the left and right front frames rotatably attached to a front side of the body, and a flapping structure mounted on an upper side of the body, the flapping structure powered by a rotary drive source, the flapping structure rotating the left and right front frames and thereby flapping the left and right wings and a duration of an upstroke of the left and right wings flapped by the flapping structure is shorter than a duration of a downstroke of the left and right wings to generate a lift force.

11 Claims, 7 Drawing Sheets

(56) References Cited

U.S. PATENT DOCUMENTS

| | | | |
|---|---|---|---|
| 4,712,749 A * | 12/1987 | Fox | 244/22 |
| 6,550,716 B1 * | 4/2003 | Kim et al. | 244/11 |
| 2004/0195439 A1 | 10/2004 | Hamamoto et al. | |
| 2005/0269447 A1 * | 12/2005 | Chronister | 244/72 |
| 2007/0262194 A1 * | 11/2007 | Agrawal et al. | 244/11 |
| 2009/0179108 A1 * | 7/2009 | Yang | 244/72 |

FOREIGN PATENT DOCUMENTS

| | | |
|---|---|---|
| JP | 4150799 B2 | 9/2008 |
| JP | 2008-273270 A | 11/2008 |
| WO | WO 2007026701 A1 * | 3/2007 |

OTHER PUBLICATIONS

Office Action dated Nov. 26, 2013, issued in corresponding Chinese application No. 201080032857.1.

International Search Report dated Aug. 24, 2010, for PCT/JP2010/062627.

Korean Office Action dated Jun. 24, 2013, issued in corresponding Korean Patent Application No. 10-2012-7002676 with Japanese translation (13 pages).

Park et al., "Characteristic of an insect-mimicking flapping device actuated by a piezoceramic actuator", Journal of the Korean Society for Aeronautical and Space Science, vol. 36, pp. 1063-1071, 2008, with English Abstract.

* cited by examiner

Enlarged View

FLAPPING FLYING ROBOT

TECHNICAL FIELD

The present invention relates to a flapping flying robot (flapping wing robot) flying like a butterfly.

BACKGROUND ART

A conventional flapping flying robot flying like birds or insects claps four wings and blows out air between wing surfaces in a direction parallel to the wing surfaces in order to generate thrust for hovering. By operating a tail wing, the conventional flapping flying robot can hover stably and control directions (see Patent Document 1, for example).

PRIOR ART DOCUMENT

Patent Document

[Patent Document 1] Japanese Unexamined Patent Application Publication No. 2008-273270

SUMMARY OF INVENTION

Problems to be Solved by the Invention

The invention disclosed in Patent Document 1 has too many components, such as the four wings and the tail wing, so that the structure thereof becomes too complicated to operate the four wings and the tail wing separately. In addition, at least two drives are required, which complicates a driving force transmission mechanism. Furthermore, the invention of the Patent Document 1 including the four wings and the tail wing is quite different from real flying animals such as birds and insects in terms of flying forms, mechanisms, and appearances. The invention of the Patent Document 1 may be applicable to, for example, toys, but not suitable for applications to anti-terrorism surveillance systems or human tracking systems proposed in Europe and the United States.

The present invention has been made in view of the above circumstances and has an object to provide a flapping flying robot without a tail wing, which can fly stably by flapping right and left wings like a butterfly.

Means for Solving Problems

To accomplish the above object, a first aspect of the present invention provides a flapping flying robot comprising: a body with a longitudinal side extending in a front to back direction; a left wing and a right wing respectively including a left front frame and a right front frame, base ends of the left and right front frames rotatably attached to a front side of the body; and a flapping means powered by a rotary drive source, the flapping means rotating the left and right front frames and thereby flapping the left and right wings; wherein durations of upstrokes of the left and right wings are shorter than durations of downstrokes of the left and right wings to generate lift forces. Unlike general air vehicles, the body of the present invention does not require a certain size and volume. The body can be any support or structure substantially connecting the left and right front frames in the rotatable manner, including a core material, such as a rod and a pipe, and a case for housing a battery.

Now, specific examples of how to set the duration of the upstroke of the left (right) wing (strictly, the left (right) front frame) shorter than the duration of the downstroke of the same will follow. (a) The respective durations of the upstroke and the downstroke of the left (right) wing are adjusted by controlling the rotary drive source (e.g., a motor) of the left (right) wing. (b) During the downstrokes of the left and right wings, the whole flapping flying robot needs to be risen up in the air using the left and right wings, which means that the downstrokes of the left and right wings take heavier loads than the upstrokes of the same. Thus, for example, a DC (direct-current) motor, a number of revolutions of which is decreased by increasing output torques, is used as the rotary drive source. (c) By setting the respective half flapping angles of the left and right wings to be upward angles (i.e., above the horizontal line passing through the rotational centers of the left and right front frames), resistance of the upstrokes of the left and right wings can be significantly lower than resistance of the downstrokes of the same.

A second aspect of the present invention provides the flapping flying robot according to claim 1, wherein the left and right wings start moving downward at the same time substantively. The flapping flying robot can fly without starting the downstroke of the left and right wings completely at the same time. It is sufficient to start the downstroke of the left and right wings within a time range of ±10% of the duration of the downstroke of the same. It is not necessary to start moving the left and right wings upward at the same time, either.

A third aspect of the present invention provides the flapping flying robot according to claim 1 or 2, wherein the flapping flying robot does not have a tail wing, and the flapping flying robot flies by flapping only the left and right wings which are pliable (flexible) during flapping.

A fourth aspect of the present invention provides the flapping flying robot according to claims 1 to 3, wherein half flapping angles of the left and right wings are set above a horizontal line passing through respective rotational centers of the left and right front frames.

A fifth aspect of the present invention provides the flapping flying robot according to claim 4, wherein the half flapping angles of the left and right wings each are 5 to 20 degrees above the horizontal line passing through the rotational center of the left and right front frames.

A sixth aspect of the present invention provides the flapping flying robot according to claims 1 to 5, wherein the flapping means is mounted on an upper side of the body.

A seventh aspect of the present invention provides the flapping flying robot according to claims 1 to 6, wherein the left and right wings are pliable during flapping, and the duration of the downstroke of the left and right wings is 1.1 to 1.5 times (more preferably 1.2 to 1.3 times) the duration of the upstroke of the left and right wings.

If the durations of the downstrokes of the left and right wings each are less than 1.1 times the durations of the upstrokes of the same, the lift forces generated by the left and right wings are decreased, which makes the flight of the flapping flying robot difficult. If the durations of the downstrokes of the left and right wings each exceed 1.5 times the durations of the upstrokes of the same, an airflow generated under the descending left and right wings escapes, which makes the generation of the lift forces difficult.

An eighth aspect of the present invention provides the flapping flying robot according to claims 1 to 7, wherein there is a difference between flapping speeds of the left and right wings. Here, "the difference between the flapping speeds" means that the rotational speeds of the left and right wings are different when the left and right wings are at the same rotational angle and their positions are symmetrical about a vertical line. The rotational speeds of the left and right wings may be different in an entire or partial range of flapping motions.

Further, if the flapping speeds of the left and right wings are different, the lift forces generated by the left and right wings are also different, which gives the flapping flying robot a turning ability.

A ninth aspect of the present invention provides the flapping flying robot according to claim 8, wherein, according to the difference between the flapping speeds of the left and right wings, mounting positions of the left and right wings on the body are changed in the front to back direction, thereby allowing the flapping flying robot to move straightforward. The flapping flying robot performs a circular flight by increasing the flapping speed of one wing, and also by changing the mounting positions of one wing and the other wing on the body in the front to back direction. Therefore, by controlling the left and right wings in combination with these methods, the flapping flying robot flies straightforward. Here, flight experiments are performed to detect if the flapping flying robot can fly straightforward when the left wing or the right wing are movably attached on the body.

A tenth aspect of the present invention provides the flapping flying robot according to claims 1 to 9, wherein the flapping means includes: a crank placed in the body with a shaft extending in the front to back direction, the crank rotatably driven in one direction by the rotary drive source; a first crank rod rotatably connecting a first support of the crank to a left connecting portion of the left front frame; and a second crank rod rotatably connecting a second support of the crank to a right connecting portion of the right front frame.

Referring to FIG. 1, motions of the flapping flying robot according to the tenth aspect of the present invention will be explained.

In FIG. 1, "O" indicates a rotational center of the left and right front frames (the left and right wings); "R" indicates a distance from the rotational center O to the left connecting portion Pu or Pd (the right connecting portion Qu or Qd); "H" indicates a distance from the rotational center O to a rotational center A of the crank; "r" indicates a radius of the crank; "S" is a length of the first crank rod (or the second crank rod); "Mu" and "Nu" respectively indicate crank angular positions of the first and second supports, corresponding to maximum upstroke angles Φu of the left and right wings; "Md" and "Nd" respectively indicate crank angular positions of the first and second supports, corresponding to maximum downstroke angles Φd of the left and right wings; and "α" indicates the half flapping angles of the left and right wings.

When the rotational center A of the crank, the rotational center O of the left and right wings, the length S of the first crank rod (or the second crank rod), the crank radius r, and a crank angle 2θ are determined in the layout of FIG. 1, the flapping motions of the left and right wings are enabled by the rotation of the crank. In this case, the left and right wings are at maximum upstroke angular positions when the first and second supports connected to the left and right wings by the first and second crank rods are located at Mu and Nu, respectively. On the other hand, the left and right wings are at maximum downstroke angular positions when the first and second supports are located at Md and Nd, respectively. Thus, the left and right wings flap within an angle PuOPd and an angle QuOQd, respectively.

Provided that the crank rotates in a clockwise direction, the left wing moves downward with the first support positioned within an angle MuAMd, and the right wing moves downward with the second support positioned within an angle NuANd. As clear from FIG. 1, the angle MuAMd is smaller than the angle NuANd, and thus if the crank rotates at a constant angle, the duration of the downstroke of the left wing becomes shorter than that of the right wing. When crank rotates in a counter-clockwise direction, the sequence of events is reversed.

Further, when the second support is set at an arbitrary angular position Nx, the first support is located at the angular position Mx. In this setting, the angles of the left and right wings are δ1 and δ2, respectively, and δ2 is bigger than δ1. Therefore, with this structure of the flapping means, the left and right wings conccurently started moving downward from the same angular position do not flap in synchronized timing, but flap with small shifts in speeds and angles. Likewise, the left and right wings do not synchronize when moving upward.

The reason for such asynchronous movements is because the rotational center of the crank is set in the front to back direction of the body, and the first and second supports of the first and second crank rods are misaligned in an acting direction when viewed from the above. The condition for such structure is that the distance R from the rotational center O to the left (or right) connecting portion needs to be sufficiently longer than the rotational radius r of the crank. For example, R/r needs to be 2.5-3.5 (more preferably 2.9-3.1). If R/r is less than 2.5, the rotational angles of the left and right wings become too large with respect to the rotation of the crank. If R/r exceeds 3.5, the rotational angles of the left and right wings become too small with respect to the rotation of the crank.

It is preferable that distance H from the rotational center O to the rotational center A is set 1.4-2.5 (more preferably 1.4-1.6) times the distance R from the rotational center O to the left connecting portion Pu (or the right connecting portion Qu). If H/R is less than 1.4, the crank rods are nearly horizontal, and a force against the downstroke of the wings is weakened. If H/R exceeds 2.5, the flapping means projects from the body, which may cause an adverse effect on the stability of the whole robot.

The length S of the first (or second) crank rod, strictly the distance S from the first (or second) support to the left (or right) connecting portion, needs to be changed in accordance with the distances R and H. To determine the distance S, it is preferable that the crank angle, i.e., the angle between the first and second supports to the rotational center A, is set to, for example, 20-80 degrees (more preferably 40-80 degrees, further preferably 55-75 degrees). Then, the distance S is approximately around the distance H between the rotational centers O and A.

As shown in FIG. 1, the half flapping angles α of the left and right wings are set within a range of 5 to 20 degrees. Accordingly, the left and the right wings flap around the half flapping angles α, and force to move the left and the right wings upward becomes smaller than force to move the same downward. For example, when the DC motor is used as the rotary drive source, the duration to move the left and the right wings upward generally becomes shorter than the duration to move the same downward.

An eleventh aspect of the present invention provides the flapping flying robot according to claim 10, wherein the first crank rod is rotatably connected by a left reinforcing member to the left front frame, the left reinforcing member provided at a base end of the left front frame; and the second crank rod is rotatably connected by a right reinforcing member to the right front frame, the right reinforcing member provided at a base end of the right front frame.

Effect of the Invention

The flapping flying robot according to the one to eleventh aspects of the present invention is capable of flying forward without falling, because the lift forces are generated by setting the durations of the downstrokes of the left and the right wings longer than the durations of the upstrokes of the same. In addition, only the flapping motions of the left and the right wings enable the flapping flying robot to fly, and thus the structure of the robot can be simple.

Particularly in the flapping flying robot according to the second aspect of the present invention, the left and right wings start moving downward at the same time. The flapping means operates the left and right wings simultaneously to rotate the wings, and thus the structure of the robot can be simple.

Further, by moving the left and right wings downward at the same time, the lift force for the whole flapping flying robot can be generated.

The flapping flying robot according to the third aspect of the present invention does not include the tail wing and is capable of flying only by flapping the pliable left and right wings. Thus, the structure is simple and the number of the components is reduced. Further, there is no need to control the tail wing, which makes the flight control easy.

In the flapping flying robot according to the fourth aspect of the present invention, the half flapping angles of the left and right wings are set above the horizontal line passing through the rotational centers of the left and right front frames. In the flapping flying robot according to the fifth aspect of the present invention, the half flapping angles of the left and right wings each are set within the range of 5 to 20 degrees. For these reasons, the resistance to move the left and right wings upward becomes larger than the resistance to move the same downward, which makes it easier to chose a motor for driving the left and right wings. Further, a center of gravity of the flapping flying robot can be set in a lower position, which allows the stable flight.

In the flapping flying robot according to the sixth aspect of the present invention, the flapping means is mounted on the upper side of the body, so that damages on the flapping means can be prevented even at belly-landing (body landing).

Further, a protector (a cover) for covering the flapping means etc. can be omitted, which allows a lighter weight and an easier maintenance.

In the flapping flying robot according to the seventh aspect of the present invention, the left and right wings are flexible during flapping, and the durations of the downstrokes of the left and right wings are 1.1-1.5 times (more preferably 1.2-1.3 times) the durations of the upstrokes of the same. Thus, the flapping motions of the left and right wings are comparatively easy to control, which further ensures the flight of the flapping flying robot.

In the flapping flying robot according to the eighth aspect of the present invention, the different flapping speeds of the left and right wings lead the different lift forces of the left and right wings, which enables the flapping flying robot to have a circling force. Therefore, the flapping flying robot can fly in a limited space (e.g., indoors).

In the flapping flying robot according to the ninth aspect of the present invention, in accordance with the difference between the flapping speeds of the left and right wings, the mounting positions of the left and right wings are changed on the body in the front to back direction, which enables the flapping flying robot to fly straightforward. The flapping flying robot having the circling force can perform a normal flight by canceling such circling force.

In the flapping flying robot according to the tenth aspect of the present invention, the flapping means includes: the crank placed in the body with the shaft extending in the front to back direction, the crank rotatably driven in one direction by the rotary drive source; the first crank rod rotatably connecting the first support of the crank to the left connecting portion of the left front frame; and the second crank rod rotatably connecting the second support of the crank to the right connecting portion of the right front frame. By rotating the crank, the left and right frames of the left and right wings rotates as well. In this case, the left and right wings are not perfectly synchronized, and thus the difference between the flapping motions of the left and right wings generates the circling force.

In the flapping flying robot according to the eleventh aspect of the present invention, the first crank rod is rotatably connected by the left reinforcing member to the left front frame, the left reinforcing member provided at the base end of the left front frame; and the second crank rod is rotatably connected by the right reinforcing member to the right front frame, the right reinforcing member provided at the base end of the right front frame. Thus, the flapping force for the left and right wings can be increased. Further, the left and right front frames, not including the left and right reinforcing members, are given the pliableness (flexibility).

MODE FOR CARRYING OUT THE INVENTION

Referring to the accompanying drawings, an embodiment of the present invention will be described for a better understanding of the present invention.

Figure 1:
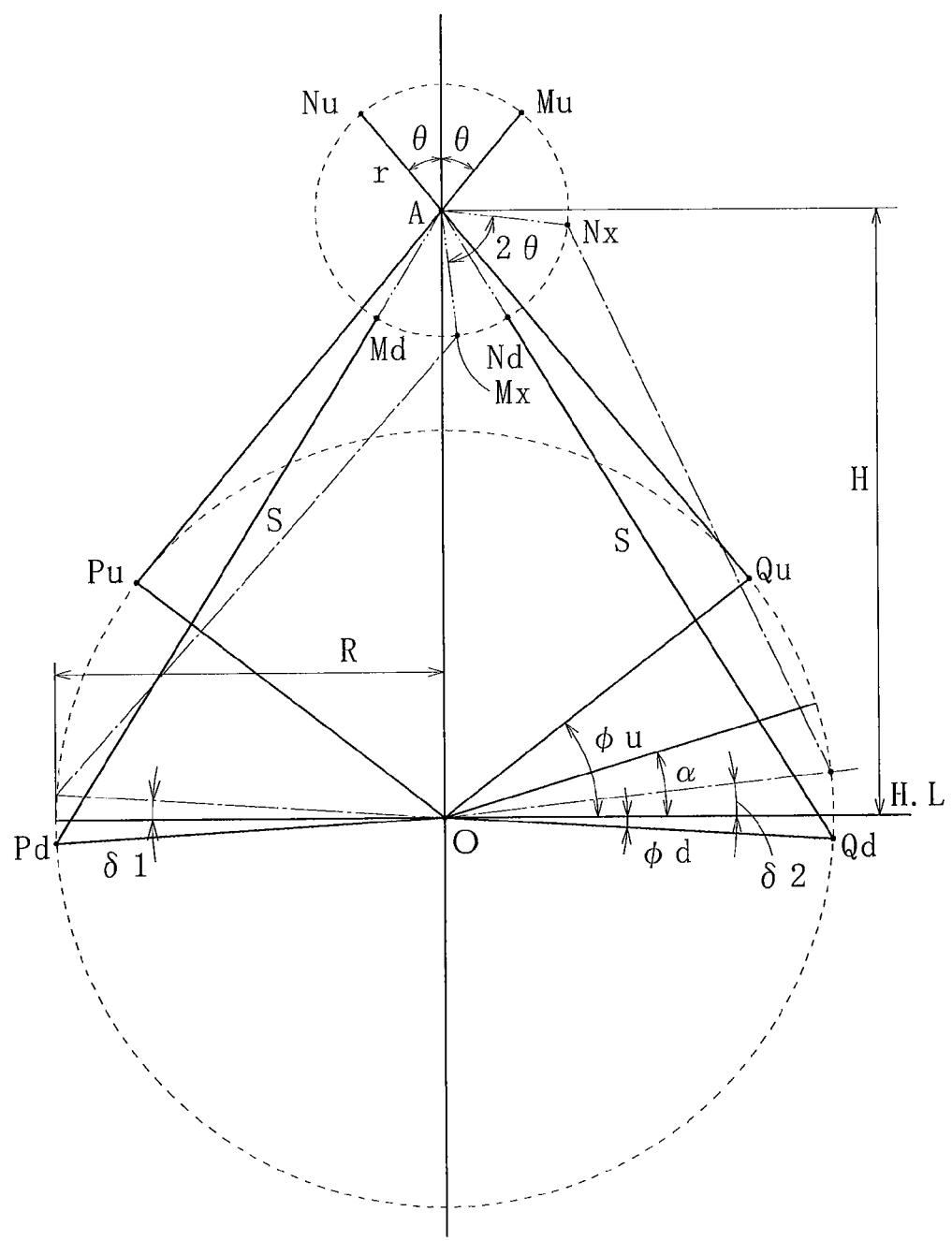
FIG. 1 is a partial explanatory diagram of a flapping flying robot according to the present invention.
Figure 2:
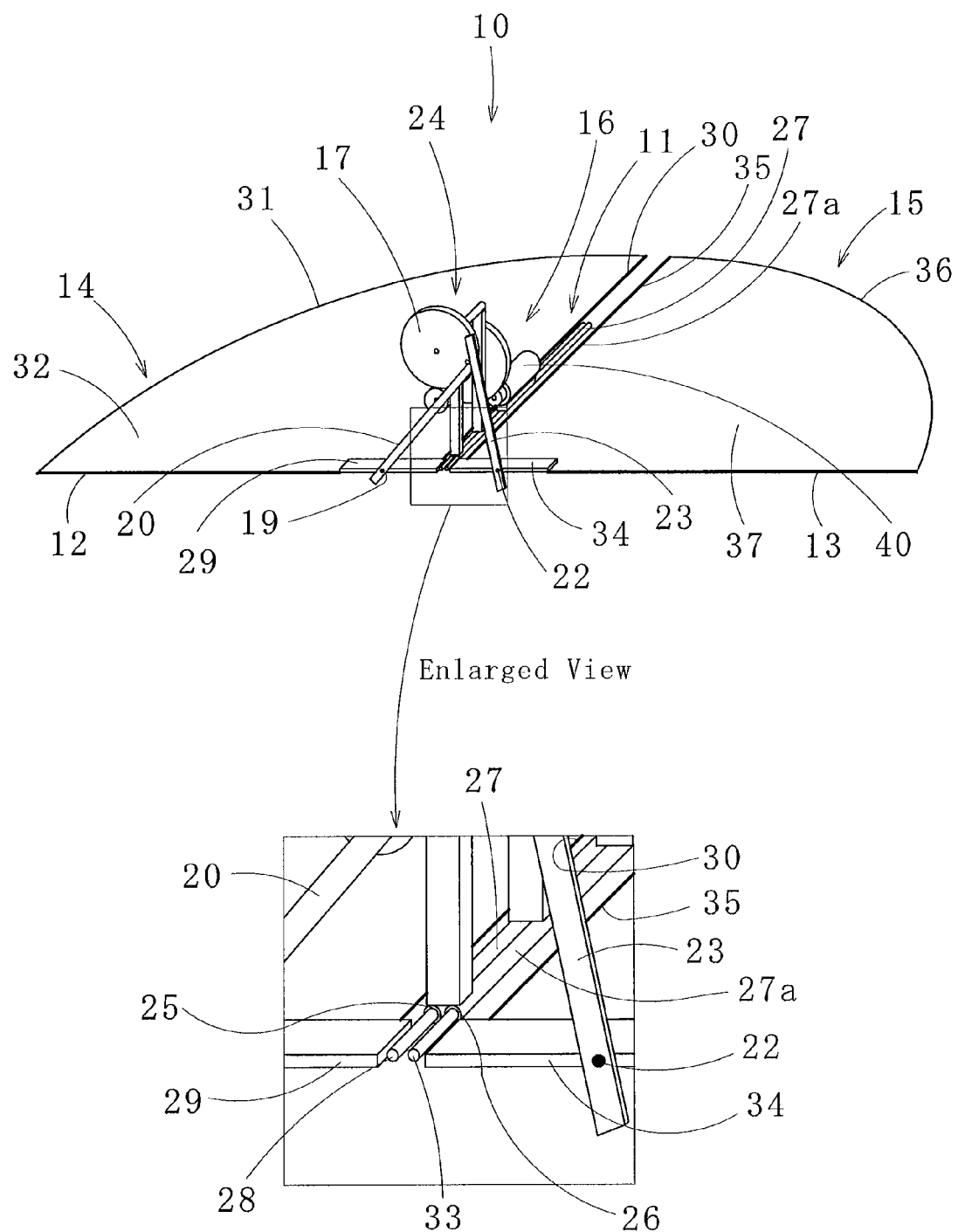
FIG. 2 is an explanatory diagram of a flapping flying robot according to one embodiment of the present invention.
Figure 3:
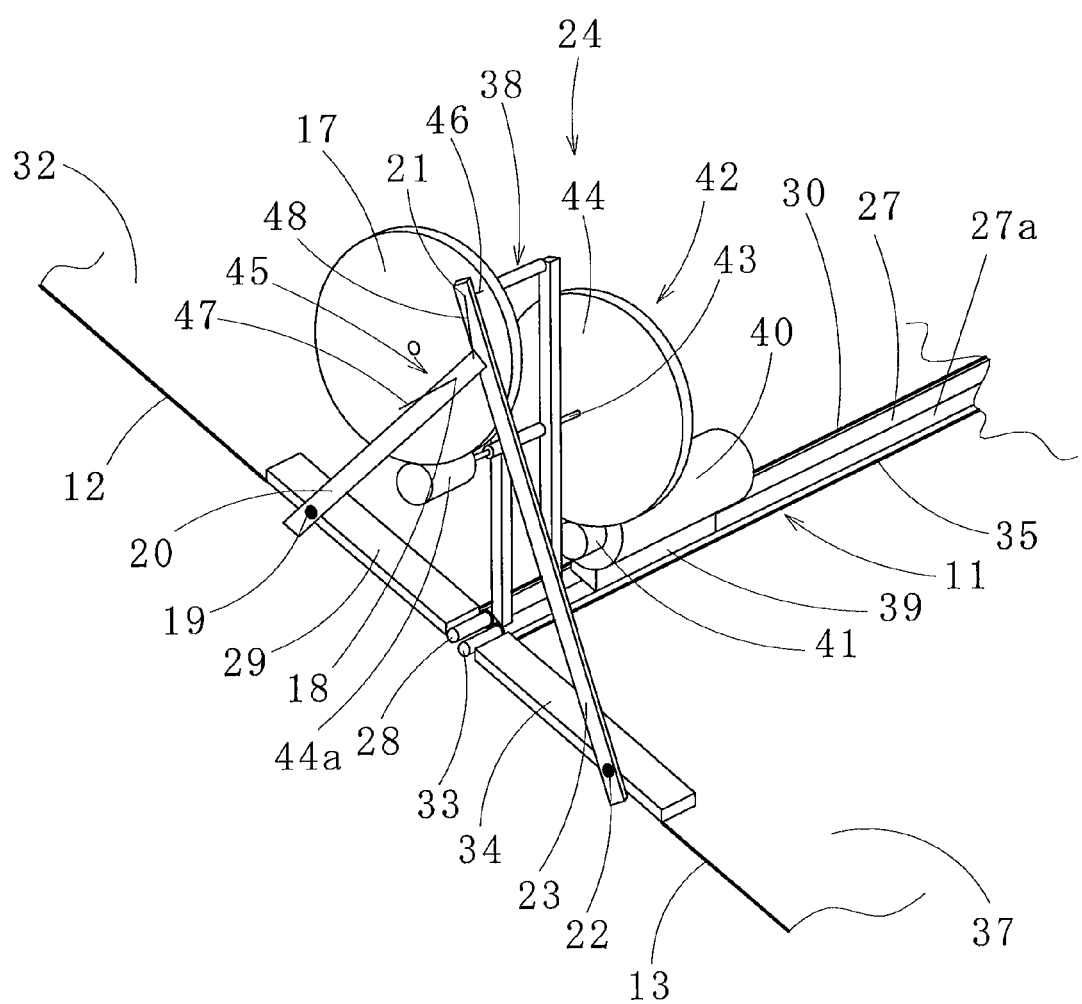
FIG. 3 is an explanatory diagram of a flapping means of the flapping flying robot.

As shown in FIGS. 2 and 3, a flapping flying robot 10 according to one embodiment of the present invention includes a body 11, a left wing 14 and a right wing 15, and a flapping means 24. A longitudinal side of the body 11 extends in a front to back direction. The left and right wings 14, 15 respectively include a left front frame 12 and a right front frame 13. Respective base ends of the left and right front frames 12, 13 are rotatably connected to a front side of the body 11. The flapping means 24 rotates the left and right front frames 12, 13 using a rotary drive source 16 as a driving force, thereby allowing the left and right wings 14, 15 to flap. The flapping flying robot 10 does not includes a tail wing (tail fin).

The flapping means 24 includes a crank 17, a first crank rod 20, and a second crank rod 23. The crank 17 is placed in the body 11 with an axis thereof arranged in the front to back direction. The crank 17 is rotatably driven in one direction by the rotary drive source 16. The first crank rod 20 rotatably connects a first support 18 of the crank 17 and a left connecting portion 19. The left connecting portion 19 is provided in the middle of the left front frame 12. The first crank rod 20 flaps the left wing 14 by the rotation of the crank 17. The second crank rod 23 rotatably connects a second support 21 of the crank 17 and a right connecting portion 22. The second support 21 is provided opposite to the first support 18 in the front to back direction. The right connecting portion 22 is provided in the middle of the right front frame 13. The second crank rod 23 flaps the right wing 15 by the rotation of the crank 17. Hereinafter, a detailed description will be made.

The body 11 includes two horizontally-disposed pipes 27, 27a. The pipes 27, 27a are arranged parallel to one another, and axes thereof extend in the front to back direction. Preferably, the pipes 27, 27a are made of a light-weight rigid material, such as a carbon composite material. For example, the carbon composite material is produced by molding a continuous carbon fiber with a resin. The pipes 27, 27a have shaft holes 25, 26 exposed at the end of the body 11.

As shown in FIG. 2, the left wing 14 includes the left front frame 12, a left shaft rod 28, a left reinforcing member 29, a left reinforcing frame 30, and a left wing sheet 32. The left front frame 12 is placed in a front edge of the left wing 14. An end (front end) of the left shaft rod 28 is attached to the base end of the left front frame 12, and an axis of the left shaft rod 28 extends in the front to back direction. The left reinforcing member 29 is placed nearer a base side than a middle portion of the left front frame 12. The left reinforcing member 29 reinforces a certain part of the left connecting portion 19 from the base side of the left front frame 12. The left reinforcing frame 30 is placed near the body 11. An end (front end) of the left reinforcing frame 30 is attached to the base side of the left front frame 12. The left wing sheet 32 is set up between the left front frame 12 and the left reinforcing frame 30. The left wing sheet 32 has a free end in a left wing end region 31 that connects a front end of the left front frame 12 and a back end of the left reinforcing frame 30. Here, the left shaft rod 28 is inserted into the shaft hole 25 of the pipe 27 from a front side thereof, so that the left shaft rod 28 is attached to the shaft hole 25 in a rotatable manner.

The right wing 15 includes the right front frame 13, a right shaft rod 33, a right reinforcing member 34, a right reinforcing frame 35, and a right wing sheet 37. The right front frame 13 is placed in a front edge of the right wing 15. An end (front end) of the right shaft rod 33 is attached to the base end of the right front frame 13, and an axis of the left shaft rod 33 extends in the front to back direction. The right reinforcing member 34 is placed nearer a base side than a middle portion of the right front frame 13. The right reinforcing member 34 reinforces a certain part of the right connecting portion 22 from the base side of the right front frame 13. The right reinforcing frame 35 is placed near the body 11. An end (front end) of the right reinforcing frame 35 is attached to the base side of the right front frame 13. The right wing sheet 37 is set up between the right front frame 13 and the right reinforcing frame 35. The right wing sheet 37 has a free end in a right wing end region 36 that connects a front end of the right front frame 13 and a back end of the right reinforcing frame 35. Here, the right shaft rod 33 is inserted into the shaft hole 26 of the pipe 27a from a front side thereof, so that the right shaft rod 33 is attached to the shaft hole 26 in a rotatable manner.

The following lengths are the same: lengths of the left and right front frames 12, 13; lengths of the left and right shaft rods 28, 33; lengths of the left and right reinforcing members 29, 34; and lengths of the left and right reinforcing frames 30, 35.

A distance from a rotational center of the left wing 14 (i.e., a shaft center of the left shaft rod 28) to the left connecting portion 19 and a distance from a rotational center of the right wing 15 (i.e., a shaft center of the right shaft rod 33) to the right connecting portion 22 are the same. Also, lengths of the left and right shaft rods 28, 33 can be longer or shorter than those of the shaft holes 25, 26, respectively.

The left and right connecting portions 19, 22 rotatably connect the first and second crank rods 20, 23 with pins, respectively. The left and right connecting portions 19, 22 can be provided directly on the left and right front frames 12, 13 or on the left and right reinforcing members 29, 34, respectively. The left and right reinforcing members 29, 34 are provided for reinforcing the left and right connecting portions 19, 22, respectively.

The left wing sheet 32 is a quarter of an ellipse, a semimajor axis and a semiminor axis of which are the left front frame 12 and the left reinforcing frame 30, respectively. The right wing sheet 37 is a quarter of an ellipse, a semimajor axis and a semiminor axis of which are the right front frame 13 and the right reinforcing frame 35, respectively. The left and right front frames 12, 13 as well as the left and right reinforcing frames 30, 35 are preferably made of a light-weight, high-strength, and flexible rod material, such as the carbon composite material produced by molding the continuous carbon fiber with the resin. Also, the left and right reinforcing members 29, 34 are preferably made of a light-weight, high-strength, and high-rigidity beam-like material, such as the carbon composite material produced by molding the continuous carbon fiber with the resin. The left and right wing sheets 32, 37 are made of, for example, a light-weight and high-strength material having a thickness of 25-40 µm, such as a Japanese traditional paper called "Washi".

The left and right shaft rods 28, 33 are rotatably held inside the shaft holes 25, 26, thereby rotatably connecting the left and right front frames 12, 13 to the body 11, respectively. Also, bottom ends of the first and second crank rods 20, 23 are rotatably connected either directly or by the left and right reinforcing members 29, 34. Thus, by rotating the first and second crank rods 20, 23, the left and right shaft rods 28, 33 respectively rotate inside the shaft holes 25, 26 and enable the left and right wings 14, 15 to flap independently at left and right sides of the body 11 (i.e., flapping motions of the left and right wings 14, 15 are actuated).

Next, explanations will be given on the flapping means 24.

The flapping means 24 is mounted on an upper side of the body 11. This structure prevents a contact of the flapping means 24 with the ground and the damage caused thereby when the flapping flying robot 10 lands on the ground. Therefore, the flapping means 24 does not require a protector (e.g., a cover), reducing a weight of the flapping flying robot 10.

Figure 5:
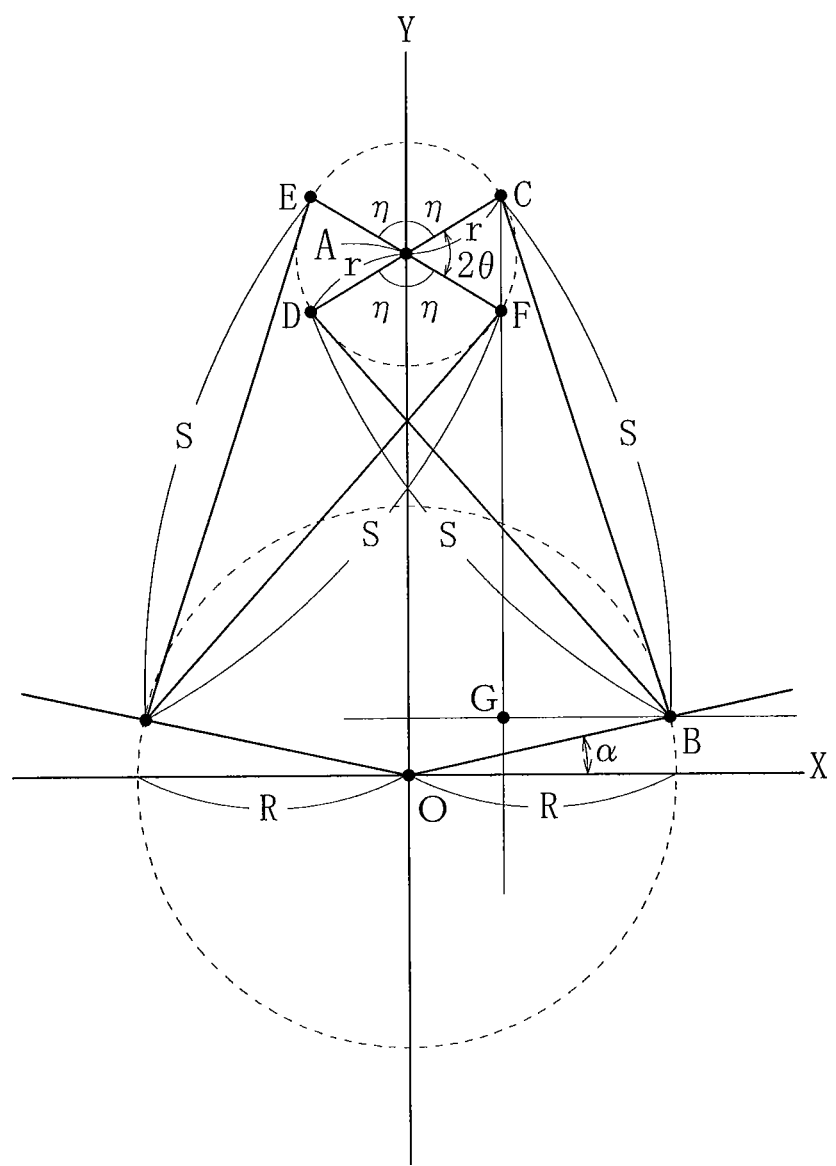
FIG. 5 is an explanatory diagram showing motions of the crank, the first crank rod, and the second crank rod.

As shown in FIGS. 3 and 5, the disk-shaped crank 17 is mounted on the upper side of the body 11 by a mounting frame 38 in a manner that an axial direction of a rotating shaft of the crank 17 extends in the front to back direction. The disk-shaped crank 17 includes external teeth (not illustrated) around the outer periphery thereof. Now, a position of the center of the rotating shaft of the crank 17 is adjusted so that a ratio H:R is, for example, 1.4-1.6. In this equation, R is a distance between the rotational center of the left wing 14 (i.e., the shaft center of the left shaft rod 28) and the left connecting portion 19, or a distance between the right wing 15 (i.e., the shaft center of the right shaft rod 33) and the right connecting portion 22. Also, H is a distance between a rotational center A (i.e., the shaft center of the rotating shaft) of the crank 17 and a shaft center of the body 11 (see FIG. 5). Here, a distance between the left and right shaft rods 28, 33 is extremely small, thus the rotational centers of the rods 28, 33 are expressed as a point O in FIG. 5.

The rotary drive source 16 includes a coreless motor 40, a lithium-ion battery (not-illustrated), and a transfer mechanism 42. The coreless motor 40, an example of DC (direct-current) motors, is mounted on a mounting base 39 provided on the upper side of the body 11 in a manner that an output shaft of the coreless motor 40 extends in the front to back direction. The lithium-ion battery, an example of power supplies for the coreless motor 40, is mounted on the body 11. The transfer mechanism 42 transmits a rotary drive force to the crank 17 via a first gear 41 attached to the output shaft of the coreless motor 40. The transfer mechanism 42 includes a rotating shaft 43, a second gear 44, and a third gear 44a. The rotating shaft 43 is rotatably attached to the mounting frame 38 by a shaft bearing so as to extend in the front to back direction. The second gear 44 is attached to the rotating shaft 43, and an outer periphery of the second gear 44 includes external teeth engaging with the first gear 41. The third gear 44a is provided at an end of the rotating shaft 43 and engages with the external teeth formed around the outer periphery of the crank 17. With this structure, the transfer mechanism 42 drastically decreases a rotational speed of the coreless motor 40, thereby rotating the crank 17 at low speed.

Figure 4A:
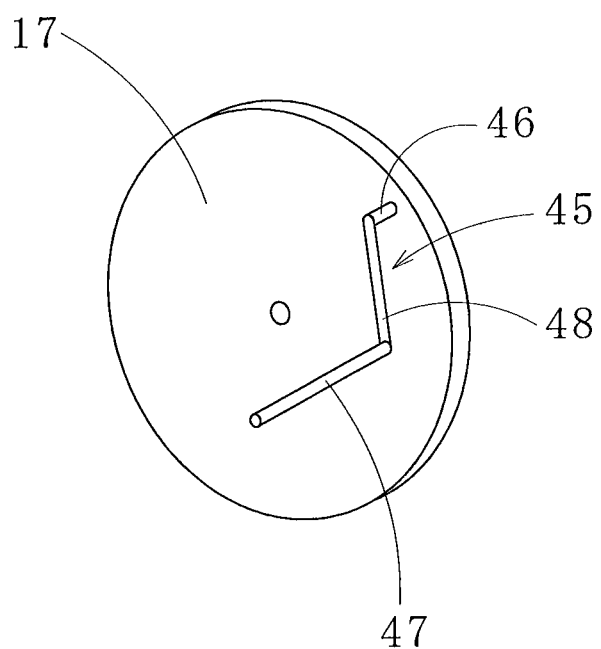
FIGS. 4 (A) and 4 (B) are explanatory diagrams showing a structure that is used for connecting a crank, a first crank rod, and a second crank rod to each other.
Figure 4B:
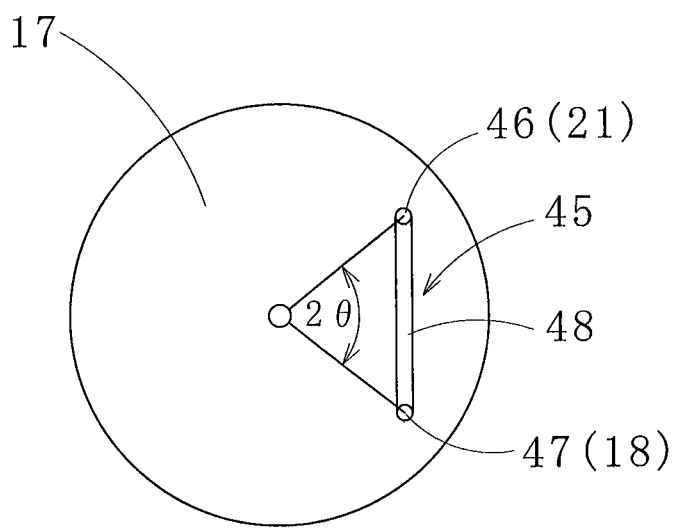

In this embodiment, the first support 18 of the crank 17 and the first crank rod 20 as well as the second support 21 of the crank 17 and the second crank rod 23 are connected by a bending pin 45 as shown in FIGS. 4 (A) and 4 (B). The bending pin 45, an example of bending parts (or crank shafts), includes a second horizontal portion 46, a first horizontal portion 47, and a joint 48. The second horizontal portion 46 serves as the second support 21, to which one of the first and second crank rods 20, 23 (e.g., the second crank rod 23) is connected. The first horizontal portion 47 serves as the first support 18, to which the first crank rod 20 is connected. The joint 48 connects a front end of the second horizontal portion 46 and a rear end of the first horizontal portion 47.

As a base of the bending pin 45, the second horizontal portion 46 is non-rotatably fixed to the crank 17. A distance from the second horizontal portion 46 to the shaft center of the crank 17 and a distance from the first horizontal portion 47 to the shaft center of the crank 17 are constant, as indicated by "r" in FIG. 5.

An upper end of the first crank rod 20 is rotatably connected to the first horizontal portion 47, particularly to the first support 18. An upper end of the second crank rod 23 is rotatably connected to the second horizontal portion 46, particularly to the second support 21. The first crank rod 20 is located at a front side of the second crank rod 23 with at least a distance equal to a thickness of the joint 48 in the front to back direction. Accordingly, the crank 17 can rotate without causing a collision between the first and second crank rods 20, 23.

Here, lower ends of the first and second crank rods 20, 23 are connected to the left and right connecting portions 19, 22, respectively. Preferably, respective front and back faces of the left and right connecting portions 19, 22 are on the same side as those of the first and second crank rods 20, 23.

A crank angle (2θ) between the first and second supports 18, 21 is defined by (a) a crank radius connecting the first support 18 and the rotational center of the crank 17 and (b) a crank radius connecting the second support 21 and the rotational center of the crank 17. Here, a ratio R:r is, for example, 2.9-3.1, where r is the crank radius of the first support 18 (or the second support 21), and R is a distance between the rotational center of the left wing 14 (or the right wing 15) and the left connecting portion 19 (or the right connecting portion 22). In addition, the ratio of (a) a length of the first crank rod 20 (or the second crank rod 23) to (b) the distance between the rotational center of the left wing 14 (or the right wing 15) and the left connecting portion 19 (or the right connecting portion 22) is, for example, 1.5-1.7.

With the above configuration, after setting the crank angles of the first and second supports 18, 21, the rotation of the crank 17 synchronizes a start time of the downstrokes of the left and right wings 14, 15. At the same time, half flapping angles of the left and right wings 14, 15 are set 5 to 20 degrees above the horizon (i.e., a horizontal line passing through the rotational centers of the left and right front frames 12, 13). That is how to flap the left and right wings 14, 15 with a flapping angular width of 20 to 35 degrees.

Here, a half flapping angle is defined as an average angular position between a maximum angular position of the upstroke of the left and right wings 14, 15 and a maximum angular position of the downstroke of the same with respect to the horizontal line (i.e., an angle between the horizontal line and the average angular position). A flapping angular width is defined as a rotational angle of the left and right wings 14, 15 from a half flapping angular position (the average angular position) to the maximum angular position of the upstroke (or the downstroke) of the same.

A total flapping angle of the left wing 14 (or the right wing 15) is defined as a sum of (a) an angle between the horizontal line and the maximum angular position of the upstroke and (b) an angle between the horizontal line and the maximum angular position of the downstroke in minus side. The total flapping angle is adjusted by setting the lengths of the first and second crank rods 20, 23 constant, and changing the distance between the rotational center of the left wing 14 and the left connecting portion 19 as well as the distance between the rotational center of the right wing 15 and the right connecting portion 22. In addition, an allocation of upper flapping angles and lower flapping angles of the left and right wings 14, 15 can be set by fixing the distance between the rotational center of the left wing 14 and the left connecting portion 19 as well as the distance between the rotational center of the right wing 15 and the right connecting portion 22, and changing the lengths of the first and second crank rods 20, 23.

When the half flapping angles, the total flapping angles, the upper flapping angles, and the lower flapping angles of the left and right wings 14, 15 are set, and the flapping of the left and right wings 14, 15 is symmetrical, then the crank angles 2θ of the first and second supports 18, 21 can be determined, for example, in the following way.

FIG. 5 shows a coordinate system with a horizontal x-axis and a vertical y-axis. The shaft center of the body 11 is set as an origin O, and a center A of the crank 17 is set on the y-axis. A point B indicates a position of the right connecting portion 22 when the right wing 15 rotates from horizon to the half flapping angle. Points C, D indicate a position of the second support 21 when the right wing 15 rotates to the half flapping angle. Provided that the crank 17 rotates in the clockwise direction when viewed from the front, the second support 21 is located at the point C when the right wing 15 starts moving downward, and the second support 21 is located at the point D when the right wing 15 starts moving upward. Likewise, provided that points E, F indicate a position of the first support 18 when the left wing 14 rotates to the half flapping angle, then the points C, E and the points D, F are symmetrical about the y-axis, and $\angle DAF = \angle CAE = 2\eta$, and further, $\angle OAD = \angle OAF = \eta$.

Provided that $\alpha$ is the half flapping angle of the left wing 14 (or the right wing 15), r is the crank radius of the first support 18 (or the second support 21), R is the distance between the rotational center of the left wing 14 (or the right wing 15) and the left connecting portion 19 (or the right connecting portion 22), S is the length of the first crank rod 20 (or the second crank rod 23), H is the distance between the shaft center of the body 11 and the center of the crank 17, then a coordinate for the point B is $(R \cos \alpha, R \sin \alpha)$ and a coordinate for the point A is $(O, H)$. In $\triangle BCD$, lengths of a line BC and a line BD are the length S of the second crank rod 23. Now, provided that G is an intersection of (a) a line passing through the point C and parallel to the y-axis and (b) a line passing through the point B and parallel to the x-axis, then $CB^2=BG^2+CG^2$, and therefore $S^2=R^2+r^2+H^2+2\ Hr\cos\eta-2HR\sin\alpha-2Rr\sin(\alpha+\eta)$. Since the value of $\alpha$ is known, the value of $\eta$ is obtained by solving this equation related to $\eta$. In addition, $2\theta=180°-2\eta$, thus the crank angles $2\theta$ between the first support 18 and the second support 21 can be determined. Further, the crank angle $2\theta$ is within a range of 55-75 degrees.

Figure 6:
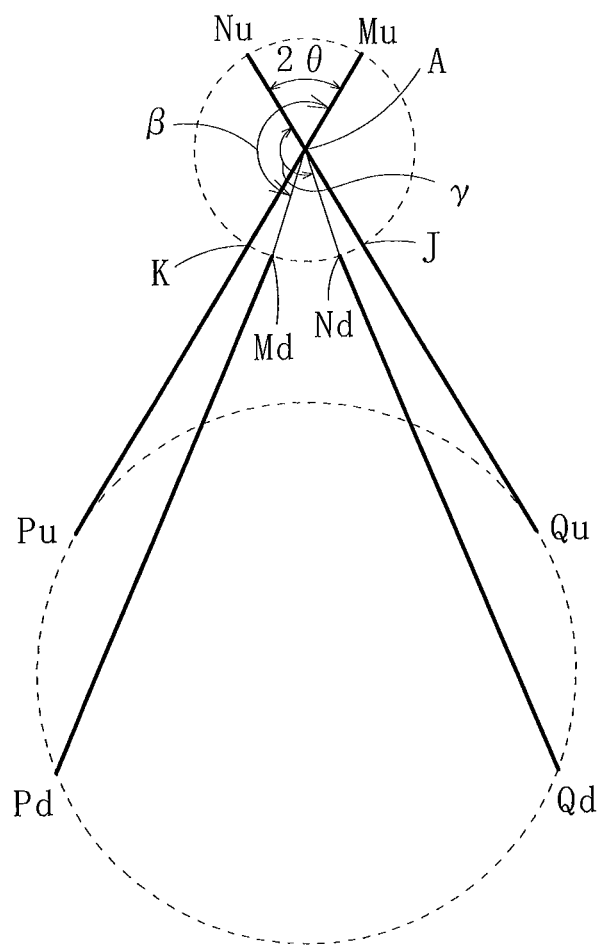
FIG. 6 is an explanatory diagram showing a relationship between rotations of a first support and a second support and flapping motions of a left wing and a right wing.

Referring to FIG. 6, functions of the flapping flying robot according to one embodiment of the present invention will be explained.

The ratio of the distance R between the rotational center of the left wing 14 and the left connecting portion 19 to the crank radius r of the first support 18 as well as the ratio of the distance R between the rotational center of the right wing 15 and the right connecting portion 22 to the crank radius r of the second support 21 is set to 2.9-3.1. These settings determine which of the upstroke movement and the downstroke movement is faster according to the rotational direction of the crank 17.

For example, when the crank 17 rotates in the clockwise direction when viewed from the front, the definitions of the numerals in FIG. 6 are as follows: Pd is the position of the left connecting portion 19 at the maximum downstroke of the left wing 14; Md is the position of the first support 18 of the crank 17 at the maximum downstroke of the left wing 14; Pu is the position of the left connecting portion 19 at the maximum upstroke of the left wing 14; Mu is the position of the first support 18 of the crank 17 at the maximum upstroke of the left wing 14; Qd is the position of the right connecting portion 22 at the maximum downstroke of the right wing 15; Nd is the position of the second support 21 of the crank 17 at the maximum downstroke of the right wing 15; Qu is the position of the right connecting portion 22 at the maximum upstroke of the right wing 15; and Nu is the position of the second support 21 of the crank 17 at the maximum upstroke of the right wing 15. The relationship of these numerals is shown in FIG. 6. As clear from FIG. 6, generally, the downstrokes of the left and right wings 14, 15 start at the same time.

While the left wing 14 moves from the maximum downstroke position to the maximum upstroke position (i.e., the left connecting portion 19 moves from Pd to Pu), the first support 18 of the crank 17 rotates in the clockwise direction by an angle β from Md and moves to Mu. While the right wing 15 moves from the maximum downstroke position to the maximum upstroke position (i.e., the right connecting portion 22 moves from Qd to Qu), the second support 21 of the crank 17 rotates in the clockwise direction by an angle γ from Nd and moves to Nu. Likewise, while the left wing 14 moves from the maximum upstroke position to the maximum downstroke position (i.e., the left connecting portion 19 moves from Pu to Pd), the first support 18 of the crank 17 rotates in the clockwise direction by an angle 360−β from Mu and returns to Md. While the right wing 15 moves from the maximum upstroke position to the maximum downstroke position (i.e., the right connecting portion 22 moves from Qu to Qd), the second support 21 of the crank 17 rotates in the clockwise direction by an angle 360−γ from Nu and returns to Nd.

Where K is an intersection of the first crank rod 20 and a locus of the first support 18 (i.e., a circle with the radius r, a center of which is the center A of the crank 17), and J is an intersection of the second crank rod 23 and a locus of the second support 21 (i.e., the circle with the radius r, the center of which is the center A of the crank 17), then $\beta = \angle MdAK + \angle KANu + \angle NuAMu;$ $360 - \beta = \angle MuAJ + \angle JAMd;$ $\angle KANu = \angle MuAJ;$ $\angle NuAMu = \angle JAMd + \angle MdAK;$ and therefore $\beta - (360 - \beta) = \angle MdAK + \angle JAMd + \angle MdAK - \angle JAMd = 2\angle MdAK > 0.$ Thus, the rotational angle of the first support 18 moving from Md to Mu (for moving the left wing 14 upward) is bigger than that of the first support 18 returning from Mu to Md (for moving the left wing 14 downward). The rotational angle of the second support 21 moving from Nd to Nu (for moving the right wing 15 upward) is smaller than that of the second support 21 returning from Nu to Nd (for moving the right wing 15 downward).

As a result, by rotating the crank 17 in a constant speed, the left wing 14 can slowly move upward and quickly move downward, the right wing 15 can quickly move upward and slowly move downward, and further the durations of the upstroke and downstroke of the left and right wings can be changed (adjusted). Since the half flapping angles of the left and right wings 14, 15 are above the horizon (in other words, a dihedral angle is provided), an air resistance to the left and right wings 14, 15 at the upstrokes can be smaller than that at the downstrokes. As a result, forces for the upstrokes and the downstrokes of the left and right wings 14, 15 become different. The motor responds to this difference and enables the left and right wings 14, 15 to slowly move downward and quickly move upward when flapping the left and right wings 14, 15. Therefore, the flapping flying robot can fly like a butterfly.

If the lengths of the crank radii of the first and second supports 18, 21 are different, for example, if the length of the crank radius of the left wing 14 is longer than that of the right wing 15, then the maximum upstroke and downstroke angles of the left wing 14 become larger than those of the right wing 15. On the other hand, if the length of the crank radius of the left wing 14 is shorter than that of the right wing 15, the maximum upstroke and downstroke angles of the left wing 14 become smaller than those of the right wing 15. That is why the flapping flying robot 10 cannot maintain a posture during flight.

In view of the above, the first and second supports 18, 21 are adjusted to have the same crank radius, allowing the maximum upstroke and downstroke angles of the left and right wings 14, 15 to be equal. That is why the flapping flying robot 10 can maintain a posture during flight.

The crank angle $2\theta$ between the first and second supports 18, 21 is set such that the left and right wings 14, 15 flap in an approximately symmetrical fashion. By adjusting the crank angle $2\theta$, for example, by changing the crank angle $2\theta$ within a range of ±10% of the obtained value, a time lapse between the start times of the upstrokes (or the downstrokes) of the left and right wings 14, 15, which is caused by a misalignment of the left wing 14 on the first support 18 and the left connecting portion 19 of the first crank rod 20 as well as a misalignment of the right wing 15 on the second support 21 and the right connecting portion 22 of the second crank rod 23, can be adjusted.

The left and right front frames 12, 13 and the left and right reinforcing frames 30, 35 have a flexibility, and the left and right wing end regions 31, 36 are free ends. When the left and right wings 14, 15 flap, the front ends of the left and right front frames 12, 13 and the back ends of the left and right reinforcing frames 30, 35 are bent due to an effect of inertia and air resistance thereto, which twists the spread left and right wing sheets 32, 37. As a result, the left and right wings 14, 15 are bent (i.e., feathering angles of the left and right wings 14, 15 are passively changed) according to the flapping movements thereof, which makes it possible to generate stable and large lift and thrust during the flight. Further, a mechanism for twisting the left and right wings 14, 15 is not required, which allows a simple structure and a light weight.

The difference between the flapping movements, including the flapping speeds and the flapping angular positions, of the left and right wings 14, gives the circling force to the flapping flying robot 10, and this difference enables the circular flight of the flapping flying robot 10. By changing the mounting positions of the left and right wings 14, 15 on the body 11 in the front to back direction, the circular flight of the flapping flying robot 10 is canceled, and as a result, the flapping flying robot 10 can fly in an approximately linear fashion. In this case, if one of the left and right wings 14, 15 is attached to the body 11 so as to move thereon in the front to back direction, and for example the left wing 14 is placed in the back side compared to the right wing 15, then a left circling force (a force for turning left) is generated. Thus, by actually changing the mounting positions of the left and right wings 14, 15, the flight of the flapping flying robot 10 is adjusted to close to the straight flight.

EXPERIMENTAL EXAMPLE

A flapping flying robot with the following specifications was made: a span (length) from a left end of a left wing to a right end of a right wing was 245 mm; a maximum length (chord length) in a front to back direction of the left and right wings was 80 mm; a length of a body was 40 mm; a total weight, including a coreless motor and a lithium ion battery, was 1.9 g; and a flapping speed of the left and right wings was 10 to 11 Hz.

Each half flapping angle of the left and right wings was 14.1 degree. Each flapping angular width of the left and right wings was 23.2 degrees. In addition, a first support and a second support had the same crank radius of 4.5 mm. A distance from a rotational center of the left wing to a left connecting portion and a distance from a rotational center of the right wing to a right connecting portion were the same length of 12 mm. Further, a distance from a center of the crank to a shaft center of a body was 18 mm.

A ratio of (a) the distance between the center of the crank and the shaft center of the body to (b) the distance between the rotational center of the left (right) wing and the left (right) connecting portion was 1.5. A ratio of (a) the distance between the rotational center of the left (right) wing and the left (right) connecting portion to (b) the length of the crank radius of the first (second) support was 2.7-3. A ratio of (a) the length of the first (second) crank rod to (b) the distance between the rotational center of the left (right) wing and the left (right) connecting portion was 1.6. And, a ratio of (a) a duration of an upstroke of the left (right) wing to (b) a duration of a downstroke of the left (right) wing was 1:1.25.

In the left and right wings, by changing the length of the crank radius, the position of the crank on the body, and positions of the left and right connecting portions, the ratio of the duration of the upstroke to the duration of the downstroke may be 1:1.1-1.5.

Figure 7:
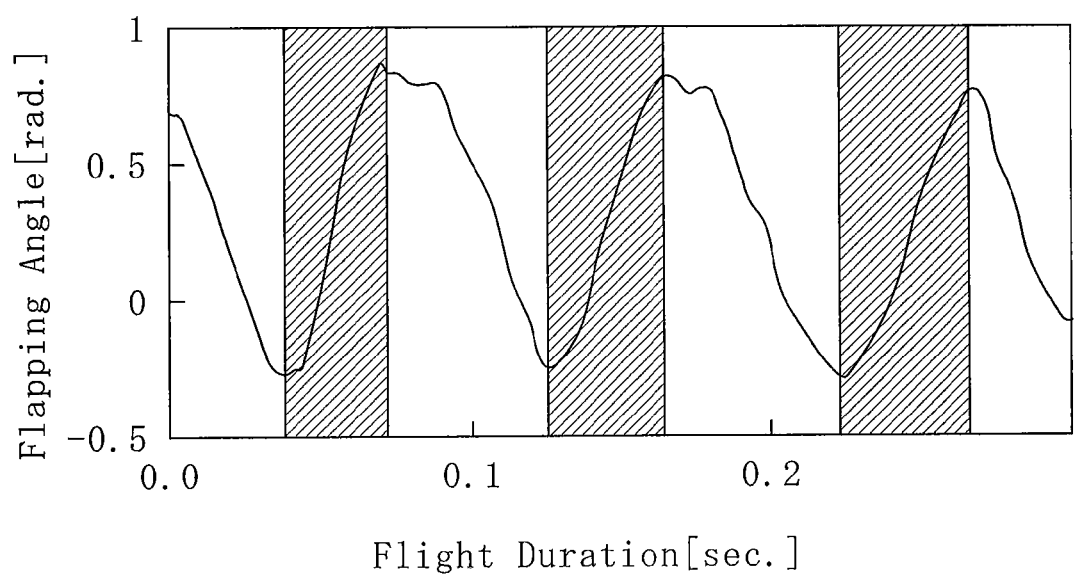
FIG. 7 is a graph showing a relationship between a flapping angle of the flapping flying robot and time.

FIG. 7 is a graph showing a transitional change of the flapping angle during a flight of the actual flapping flying robot. As shown in FIG. 7, in both of the left and right wings, the duration of the downstroke was longer than that of the upstroke in spite of a small difference in time.

While the embodiments of the present invention have been described above, the present invention is not limited to the above-described embodiments, and other embodiments and various modifications may be made without departing from the scope of the present invention.

For example, the crank rotates in the clockwise direction when viewed from the front, but the crank may rotate in the counter-clockwise direction. In this case, if there is a phase difference between flapping movements of the left and right wings, the phase difference is reversed and thus the circling direction is also reversed.

INDUSTRIAL APPLICABILITY

If the flapping flying robot according to the present invention is equipped with a miniature camera, a sensor, and a GPS, the robot can support lifesaving activities in disaster areas or buildings collapsed by disasters such as earthquakes. When a secondary disaster occurs during disaster-relief operations, the flapping flying robot can continue the disaster-relief operations with less human damage. Also, the flapping flying robot enables maintenances and inspections of constructions, which are difficult for humans to enter, such as historical architectures. Furthermore, since flying like a butterfly, the flapping flying robot can be applied to anti-terrorism systems for monitoring dangerous people and manhunt systems.

DESCRIPTION OF NUMERALS

10: flapping flying robot; 11: body; 12: left front frame; 13: right front frame; 14: left wing; 15: right wing; 16: rotary drive source; 17: crank; 18: first support; 19: left connecting portion; 20: first crank rod; 21: second support; 22: right connecting portion; 23: second crank rod; 24: flapping means; 25, 26: shaft hole; 27, 27a: pipe; 28: left shaft rod; 29: left reinforcing member; 30: left reinforcing frame; 31: left wing end region; 32: left wing sheet; 33: right shaft rod; 34: right reinforcing member; 35: right reinforcing frame; 36: right wing end region; 37: right wing sheet; 38: mounting frame, 39: mounting base; 40: coreless motor; 41: first gear; 42: transfer mechanism; 43: rotating shaft; 44: second gear; 44a: third gear; 45: bending pin; 46: second horizontal portion; 47: first horizontal portion; 48: joint

The invention claimed is:
1. A flapping flying robot comprising:
a body with a longitudinal side extending in a front to back direction;
a left wing and a right wing respectively including a left front frame and a right front frame, base ends of the left and right front frames rotatably attached to a front side of the body; and
a flapping means mounted on an upper side of the body, the flapping means powered by a rotary drive source, the flapping means rotating the left and right front frames and thereby flapping the left and right wings; wherein
a duration of an upstroke of the left and right wings flapped by the flapping means is shorter than a duration of a downstroke of the left and right wings to generate a lift force, wherein the flapping means includes:
a crank placed in the body with a shaft extending in the front to back direction, the crank rotatably driven in one direction by the rotary drive source;
a first crank rod rotatably connecting a first support of the crank to the left connecting portion of the left front frame; and a second crank rod rotatably connecting a second support of the crank to a right connecting portion of the right front frame.

2. The flapping flying robot as defined in claim 1, wherein the first crank rod is rotatably connected by a left reinforcing member to the left front frame, the left reinforcing member provided at a base end of the left front frame; and the second crank rod is rotatably connected by a right reinforcing member to the right front frame, the right reinforcing member provided at a base end of the right front frame.

3. The flapping flying robot as defined in claim 1, wherein a crank angle between the first and second supports is within a range of 55 to 75 degrees.

4. The flapping flying robot as defined in claim 1, wherein the duration of the downstroke of the left and right wings is 1.1 to 1.5 times the duration of the upstroke of the left and right wings.

5. The flapping flying robot as defined in claim 4, wherein the first crank rod is rotatably connected by a left reinforcing member to the left front frame, the left reinforcing member provided at a base end of the left front frame; and the second crank rod is rotatably connected by a right reinforcing member to the right front frame, the right reinforcing member provided at a base end of the right front frame.

6. The flapping flying robot as defined in claim 4, wherein a crank angle between the first and second supports is within a range of 55 to 75 degrees.

7. The flapping flying robot as defined in claim 1, wherein the left and right wings start moving downward at a same time.

8. The flapping flying robot as defined in claim 1, wherein the flapping flying robot does not have a tail wing, and the flapping flying robot flies by flapping the left and right wings.

9. The flapping flying robot as defined in claim 1, wherein half flapping angles of the left and right wings are set above a horizontal line passing through a rotational center of the left and right front frames.

10. The flapping flying robot as defined in claim 9, wherein the respective half flapping angles of the left and right wings are 5 to 20 degrees above the horizontal line passing through the rotational center of the left and right front frames.

11. The flapping flying robot as defined in claim 1, wherein there is a difference between flapping speeds of the left and right wings.

* * * * *